(12) United States Patent
Haas et al.

(10) Patent No.: US 6,471,905 B1
(45) Date of Patent: Oct. 29, 2002

(54) INTERNAL RELEASE AGENTS FOR PRODUCING POLYURETHANE MOULDED BODIES

(75) Inventors: Peter Haas, Haan; Reiner Paul, Leichlingen, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/509,183

(22) PCT Filed: Sep. 16, 1998

(86) PCT No.: PCT/EP98/05873

§ 371 (c)(1),
(2), (4) Date: Mar. 22, 2000

(87) PCT Pub. No.: WO99/16602

PCT Pub. Date: Apr. 8, 1999

(30) Foreign Application Priority Data

Sep. 29, 1997 (DE) .......................................... 197 42 870

(51) Int. Cl.$^7$ .............................. C08J 5/00; C08K 3/20; C08K 5/52; C08K 5/42; C08L 75/00
(52) U.S. Cl. ................. 264/331.19; 524/127; 524/157; 524/284; 524/589; 524/590
(58) Field of Search ................................ 524/589, 590, 524/127, 157, 284; 264/331.19

(56) References Cited

U.S. PATENT DOCUMENTS

| | | | |
|---|---|---|---|
| 3,726,952 A | 4/1973 | Boden et al. ................. 264/48 |
| 3,925,527 A | 12/1975 | Kleimann et al. ............ 264/53 |
| 4,024,088 A | 5/1977 | Godlewski ............... 260/2.5 A |
| 4,040,992 A | * 8/1977 | Bechara et al. | |
| 4,098,731 A | * 7/1978 | von Bonin et al. | |
| 4,111,861 A | 9/1978 | Godlewski .................. 521/123 |
| 4,130,698 A | 12/1978 | Sparrow et al. ............ 521/130 |
| 4,201,847 A | 5/1980 | Kleimann et al. .......... 521/172 |
| 4,254,228 A | 3/1981 | Kleimann et al. .......... 521/128 |
| 4,430,453 A | 2/1984 | Seifert et al. ................ 521/107 |
| 4,519,965 A | 5/1985 | Taylor et al. ................. 264/51 |
| 4,537,832 A | 8/1985 | Kohmoto et al. ........... 428/216 |
| 4,581,386 A | 4/1986 | Taylor et al. ................ 521/125 |
| 5,594,088 A | 1/1997 | Nagata et al. ................. 528/77 |
| 5,753,730 A | 5/1998 | Nagata et al. ............... 524/136 |

FOREIGN PATENT DOCUMENTS

GB    1365215    8/1974

* cited by examiner

Primary Examiner—Patrick D. Niland
(74) Attorney, Agent, or Firm—Joseph C. Gil; N. Denise Brown

(57) ABSTRACT

The present invention relates to improved internal mould release agents based on particular ammonium or metal salts of phosphoric acid esters, ammonium salts of carboxylic acids and/or ammonium or metal salts of sulfonic acids for producing cellular or compact, optionally glass fiber- and/or natural fiber-reinforced polyurethane mouldings. The polyurethane mouldings produced according to the invention may be laminated or coated with other materials.

2 Claims, No Drawings

INTERNAL RELEASE AGENTS FOR PRODUCING POLYURETHANE MOULDED BODIES

The present invention relates to improved internal mould release agents for producing cellular or compact polyurethane mouldings, in particular polyurethane mouldings which are laminated or coated with other materials.

Internal mould release agents for producing polyurethane mouldings, in particular polyurethane foams, have long been known. Thus, for example, mould release agents are described in DE-A 21 21 670, 19 53 637 and 23 07 589 in relation to the production of foams, which mould release agents consist of salts of aliphatic carboxylic acids with preferably primary amines or amide or ester group-containing amines, the total carbon value of which is at least 25 carbon atoms.

U.S. Pat. No. 4,024,088 mentions, inter alia, organophosphorus compounds as internal mould release agents Which contain at least 8 carbon atoms per molecule. Furthermore, internal mould release agents are known from U.S. Pat. No. 4,098,731 which are based on metal salts of a carboxylic acid, amidocarboxylic acid, phosphoric acid or boric acid in combination with specific tertiary amines. U.S. Pat. No. 4,098,731 also describes internal mould release agents used in the production of polyurethane mouldings and based on salts of carboxylic acids having at least 8 carbon atoms and tertiary amines. Moreover, internal mould release agents are known from U.S. Pat. No. 4,220,727 which consist, inter alia, of metal salts of fatty acids and specific quaternary aralkyl ammonium salts. Zinc carboxylates with long-chain carboxyl residues (8 to 24 carbon atoms) are known as internal mould release agents, for example from U.S. Pat. No. 4,519,965, U.S. Pat. No. 4,581,386 and U.S. Pat. No. 4,111,861. In addition, the use of higher fatty acid esters as mould release agents is known from U.S. Pat. No. 4,130,698.

The mould release agents known hitherto exhibit a wide variety of disadvantages from the point of view of the production of cellular or compact polyurethane mouldings. Thus, the metal salts of higher carboxylic acids tend, after a time, towards crystallisation and gel formation, if they are added to the starting components for producing polyurethane mouldings, whereby the viscosity and flow behaviour of the polyurethane compositions are disadvantageously modified. With other mould release agents, in particular those with non-polar or polar constituents, a two-phase system forms owing to the frequently inadequate solubility of the components in the polyurethane starting materials, which leads to problems processing the polyurethane moulding compositions.

Another considerable disadvantage of the internal mould release agents known hitherto is the so-called build-up in the mould, whereby the mould contours gradually become clogged over relatively long cycles. The fine contours of the moulds used, which are stuck up and clogged with polyurethane compositions, may be returned to the original state only by subsequent complex cleaning, which naturally causes an interruption in production.

The object of the present invention is to provide internal mould release agents which avoid the above-described disadvantages of previous mould release agents and therefore have altogether an improved range of properties.

The present invention therefore relates to improved internal mould release agents for producing polyurethane mouldings consisting of a) ammonium or metal salts of phosphoric acid esters of the formula (I)

wherein
R stands for $C_1$–$C_{10}$, preferably $C_4$–$C_8$ alkyl,
X denotes $OR^1$, with $R^1$ being equal to R or O—$Y^+$ and
Y stands for $NH_4$ and $N(R^2,R^3,R^4,R^5)$, wherein $R^2$ to $R^5$ are the same or different and denote hydrogen of $C_1$–$C_{10}$ alkyl, wherein the $C_1$–$C_{10}$ alkyl residue may be mono- or polysubstituted by $OR^6$ or $NR^6R^7$ and $R^6$ and $R^7$ have the meaning of hydrogen or $C_1$–$C_{10}$ alkyl, or wherein $R^2$ to $R^5$ signify

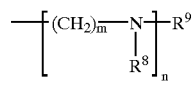

in which
$R^8$ and $R^9$ are the same or different and stand for $C_1$–$C_{10}$ alkyl or hydrogen,
m is a whole number from 2 to 4 and
n is a whole number from 1 to 5,
or
Y stands for metals of the first main group of the periodic system of elements (Mendeléeff), b) ammonium salts of carboxylic acids of the formula (II)

$$R^{10}COO^-Z^+ \quad (II),$$

in which
$R^{10}$ stands for hydrogen, $C_1$–$C_9$ alkyl or $C_6$–$C_{10}$ aryl, which may optionally be substituted by $C_1$–$C_3$ alkyl groups, and
Z has the meaning of Y with the exception of the above-mentioned metals of the first main group of the periodic system of elements,
and/or c) ammonium or metal salts of sulfonic acids of the formula (III)

in which
$R^{11}$ has the meaning of $R^{10}$ and Y has the meaning given in formula (I).

Particular mention is made of the following as $C_1$–$C_{10}$ alkyl residues of the above-mentioned formulae:

n-butyl, iso-butyl, n- and iso-pentyl, 2-ethylhexyl, octyl, n-propyl, iso-propyl, ethyl, methyl, nonyl, decyl, in particular n- and iso-butyl, n- and iso-pentyl, 2-ethylhexyl, octyl.

The residue Y of the above-mentioned formula stands, particularly preferably, for $NH_4^\oplus$, $N(CH_3)_3H^\oplus$, $N(C_2H_5)_3$ $H^\oplus$, $N(C_2H_5)_4{}^\oplus$, $HO-CH_2CH_2-N(CH_3)_2H^\oplus$, $NH_2(CH_2)_3N(CH_3)_2H^\oplus$, $(CH_3)_2N-(CH_2)_3-N(CH_3)_2H^\oplus$,

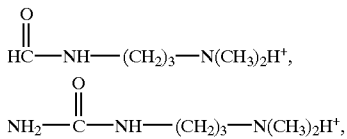

$CH_3O-(CH_2)_2-N(CH_3)_2H^\oplus$, $HO-CH_2-CH_2-NH_3{}^\oplus$, $(HO-CH_2-CH_2)_2NCH_3H^\oplus$,

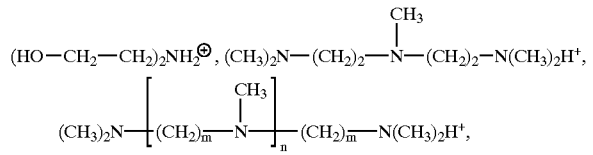

The letter m preferably stands for a whole number from 2 to 3 and n preferably stands for 1 to 3.

The following are worthy of particular mention as metals of the first main group of the periodic system of elements: lithium, sodium, potassium.

The following salts are particularly suitable as mould release agents for producing polyurethane mouldings:

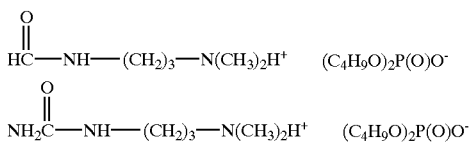

$HOCH_2-CH_2NH_3{}^+(C_4H_9O)_2P(O)O^-$ $NH_2-(CH_2)_3N(CH_3)_2H^+(C_4H_9O)_2P(O)O^-$ $^\oplus NH_3-(CH_2)_3-N(CH_3)_2H^+2(C_4H_9O)_2P(O)O^-$ $HO-CH_2-CH_2-NH_3{}^+(C_8H_{17}O)_2P(O)O^-$ $HO-CH_2-CH_2-N(CH_3)_2H^+(C_8H_{17}O)_2P(O)O^-$ $NH_2-(CH_2)_3N(CH_3)_2H^+(C_8H_{17}O)_2P(O)O^-$

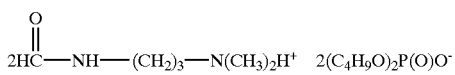

$HO-CH_2-CH_2-N(CH_3)_2H^+C_7H_{15}-COO^-$ $HO-CH_2-CH_2-N(CH_3)_2H^+C_6H_{13}-COO^-$ $HO-CH_2-CH_2-N(CH_3)_2H^+CH_3SO_3{}^-$

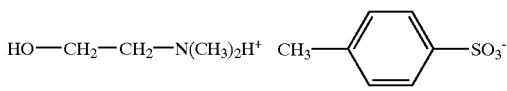

$Na^+(C_4H_9O)_2P(O)O^-$

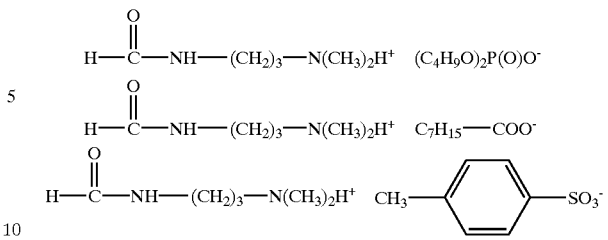

The following salts are most particularly preferred:

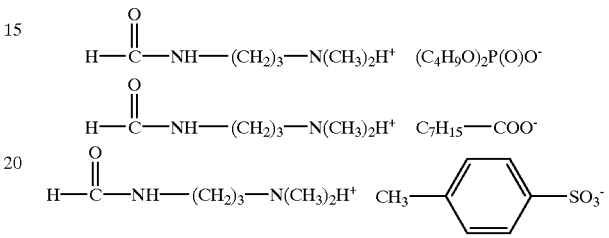

As mentioned, the mould release agents according to the invention are suitable for producing cellular or compact polyurethane mouldings.

The polyurethane mouldings may be produced in conventional manner by reacting a) polyisocyanates or polyisocyanate prepolymers with
b) at least one compound comprising at least two isocyanate-reactive groups and having a molecular weight of from 400 to 10,000, optionally in the presence of chain extenders of molecular weights ranging from 32 to 399, wherein the reaction of components a) and b) may be performed optionally in the presence of water and/or organic blowing agents, stabilisers, activators together with other auxiliary substances and additives known per se.

In addition to the above-mentioned additives, organic and inorganic fillers may also be added during processing to the polyurethane compositions obtained to reinforce the mouldings. Examples of such fillers are glass fibres, wollastonite, sisal, flax, jute, hemp and/or wood chips.

The principal substances used as stabilisers are polyether siloxanes. These compounds generally comprise a short-chain copolymer of ethylene oxide and propylene oxide combined with a polydimethyl siloxane residue. Such foam stabilisers are described, for example, in U.S. Pat. Nos. 2,834,748, 2,917,480 and 3,629,308.

Examples of catalysts are: tertiary amines, such as triethylamine, tributylamine, N-methylmorpholine, N-ethylmorpholine, N,N,N',N'-tetramethylethylenediamine, pentamethyldiethylenetriamine and higher homologues (DE-A 2 624 527 and 2 624 528), 1,4-diazabicyclo-(2,2,2)-octane, N-methyl-N'-dimethylaminoethylpiperazine, bis-(dimethylaminoalkyl)piperazine, N,N-dimethylbenzylamine, N,N-dimethylcyclohexylamine, N,N-diethylbenzylamine, bis-(N,N-diethylaminoethyl) adipate, N,N,N',N'-tetramethyl-1,3-butanediamine, N-N-dimethyl-β-phenylethylamine, 1,2-dimethylimidazole, 2-methylimidazole, monocyclic and bicyclic amidines as well as bis-(dialkylamino)alkyl ethers and 2,2-bis-(dimethylaminoethyl) ethers, and also metal carboxylates such as potassium acetate or potassium octoate.

Organometallic compounds, in particular organotin compounds, may also be used as catalysts. In addition to sulfur-containing compounds, such as di-n-octyltin mercaptide, suitable organotin compounds preferably include tin(II) salts of carboxylic acids, such as tin(II) acetate, tin(II) octoate, tin(II) ethylhexoate and tin(II) laurate, and tin(IV) compounds, for example dibutyltin oxide, dibutyltin dichloride, dibutyltin diacetate, dibutyltin dilaurate, dibutyltin maleate or dioctyltin diacetate.

In order to obtain cellular polyurethane mouldings, for example, the reaction of component a) with component b) may, as mentioned above, be performed with water and/or organic blowing agents. All known blowing agents are suitable as organic blowing agents, in particular hydrocarbons, such as n-pentane, c-pentane and iso-pentane, together with fluorinated hydrocarbons, such as tetrafluoroethane and monofluorodichloroethane.

Suitable polyisocyanates or polyisocyanate prepolymers (component a)) are known aliphatic, cycloaliphatic and araliphatic isocyanates and preferably aromatic polyvalent isocyanates, as cited for example in EP-A 364 858. Particularly suitable are tolylene diisocyanates and diphenylmethane diisocyanates, the modification products thereof or their corresponding prepolymers, which may be modified by urethane, urea, biuret, allophanate, carbodiimide or uretidione groups. Aromatic polyisocyanates worthy of particular mention are: 4,4'-diphenylmethane diisocyanate, mixtures of 2,4'- and 4,4'-diphenylmethane diisocyanate or crude methyl diisocyanate types.

Reaction component b) may suitably comprise, in particular, polyols or polyol mixtures which exhibit an OH value of from 20 to 1800, wherein an average OH value of altogether 300 to 900 is established. The individual constituents of component b) have an average molecular weight of from 400 to 10,000.

Particularly favourable are polyols from the group comprising polyether and polyester polyols, as obtained by the addition of alkylene oxide, such as ethylene oxide or propylene oxide, to polyfunctional starter molecules, such as ethylene glycol, propylene glycol, glycerol, trimethylolpropane, sorbitol, ethylenediamine, or by condensing dicarboxylic acids, such as adipic acid, succinic acid, glutaric acid, suberic acid, sebacic acid, maleic acid, phthalic acid, with predominantly bifuictional hydroxy components, such as ethylene glycol, propylene glycol and diethylene glycol.

Particularly suitable chain extenders, which may be used in the reaction together with component b), are compounds with molecular weights of from 32 to 399.

Mention should be made of: ethylene glycol, 1,4-butanediol and glycerol and adducts of trimethylolpropane, glycerol, pentaerythritol and sorbitol with propylene oxide and/or ethylene oxide.

The mould release agents according to the invention are conventionally used in amounts of from 0.5 to 20, preferably 1 to 15, parts by weight, based on 100 parts by weight of the reactive component b).

Using the internal mould release agents according to the invention, it is possible, for example, to produce cellular polyurethane mouldings by the foam moulding process, said process being performed in closed moulds by foaming a reaction mixture of polyisocyanates, compounds with reactive hydrogen atoms, water and/or organic blowing agents and optionally further auxiliary substances and additives in combination with the above-mentioned internal mould release agents at die temperatures of preferably approximately 60–75° C. The production of polyurethane mouldings is described, for example, in *Kunststofjhandbuch, Vol. 7, Polyurethanes*, 3rd revised edition, Carl Hanser Verlag, Munich/Vienna, 1993.

The production of corresponding natural fibre mat- or glass fibre mat-reinforced PU mouldings from PU reaction mixtures free or virtually free of blowing agents is performed by the compression moulding process at die temperatures of approximately 95 to 135° C.

As has already been mentioned above, the mould release agents according to the invention provide excellent mould release properties, good flow and impregnation behaviour in the case of components a) and b) used for producing polyurethane composition and do not have a tendency to build up in the mould, i.e. to contaminate the mould with deposits of polyurethane compositions.

EXAMPLES

Description of Raw Materials

I) Mould Release Components (MRC) According to the Invention

1. 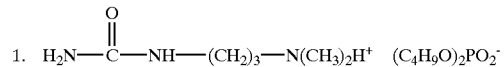

Prepared from 210 g (1 mol) dibutyl phosphate by the dropwise addition of 145 g (1 mol) 3-dimethylaminopropyl urea at 30° C.:

Acid value: 158 mg KOH/g; Mp: 105° C.

2. 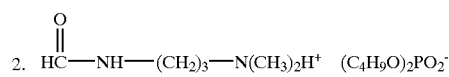

Prepared from 210 g (1 mol) dibutyl phosphate by the dropwise addition of 130 g (1 mol) 3-dimethylaminopropyl formamide at 30° C.:

Acid value: 165 mg KOH/g; Mp: 35° C.

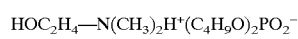 3.

Prepared from 210 g (1 mol) dibutyl phosphate by the dropwise addition of 89 g (1 mol) N,N-dimethylethanolamine.

Acid value: 187 mg KOH/g.

 4.

Prepared from 322 g (1 mol) bis-2-ethylhexyl phosphate by the dropwise addition of 89 g (1 mol) N,N-dimethylethanolamine.

Acid value: 135 mg KOH/g.

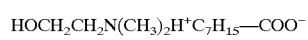 5.

Prepared from 144 g (1 mol) 2-ethylhexanoic acid and 89 g (1 mol) N,N-dimethylethanolamine.

Acid value: 240 mg KOH/g.

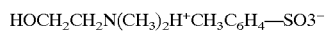   6.

Prepared from 172 g (1 mol) 4-methylbenzene sulfonic acid and 89 g (1 mol) N,N-dimethylethanolamine.

Acid value: 213 mg KOH/g.

II) Polyols

Polyol 1

Polyether polyol of OH value 470, prepared by the addition of propylene oxide to a starter mixture of 80 parts by weight sugar, 15 parts by weight propylene glycol and 5 parts by weight water.

Polyol 2

Polyether polyol of OH value 380, prepared by the addition of propylene oxide to a starter mixture of 45 parts by weight sugar, 50 parts by weight diethylene glycol and 5 parts by weight water.

Polyol 3

Polyether polyol of OH value 865, prepared by the addition of propylene oxide to trimethylolpropane.

Polyol 4

Polyether polyol of OH value 515, prepared by the addition of propylene oxide to propylene glycol.

Polyol 5

Polyether polyol of OH value 475, prepared by the addition of propylene oxide to a starter mixture of 80% sugar and 20% propylene glycol.

Polyol 6

Polyether polyol of OH value 1000, prepared by the addition of propylene oxide to trimethylolpropane.

Polyol 7

Polyether polyol of OH value 640, prepared by the addition of propylene oxide to ethylenediamine as initiator.

Polyol 8

Polyether polyol of OH value 480, prepared by the addition of propylene oxide to ethylenediamine as initiator.

Polyol 9

Polyether polyol of OH value 42, prepared by the addition of 86% propylene oxide and 14% ethylene oxide to propylene glycol as initiator.

III Polyisocyanates

Polyisocyanate, prepared by reacting the fatty acid polyester C disclosed in DE-OS 2 307 589 to the prepolymer according to Example 1 of DE-OS 2 307 589 with an NCO content of 28.4%.

PRACTICAL EXAMPLES

The reaction components were used to produce thin-walled trim parts and sheet samples. Manufacture thereof was effected under conventional PU processing conditions.

The temperatures of the raw materials during processing lay between 25 and 30° C.

| Recipe 1 | |
|---|---|
| Polyol 1 | 40 parts by weight |
| Polyol 2 | 50 parts by weight |
| Polyol 3 | 10 parts by weight |
| Comp. MRC 1 | 10 parts by weight |
| Dibutyltin dilaurate (DBTDL) | 0.15 parts by weight |
| K acetate (25% in DEG) | 0.5 parts by weight |
| Polyisocyanate 1 | 129 parts by weight |

Approximately 250 g of Recipe 1 were applied to both sides of a natural fibre mat of sisal/flax (1:1) with a weight per unit area of 1000 g/m$^2$ and then compression-moulded in a steel mould with a surface area of approximately 1 m$^2$ at a temperature of 125–135° C. for 60–80 secs to produce a wall thickness of from 1.8–2 mm.

When the mould was opened, the moulded article could be removed without demoulding aids. Demoulding was effected more than 250 times without visible mould build-up, release being achieved the first time the mould was opened.

Recipe 2

As Recipe 1, except that 10 parts by weight of component MRC 2 were used and appropriately processed instead of MRC 1.

The moulded article left the mould without difficulty the first time the mould was opened, and no material build-up could be detected in the mould after a relatively long production run.

Recipe 3

As Recipe 1, except that 8 parts by weight of component MRC 3 were dissolved and appropriately processed instead of MRC 1.

The trim part left the mould without difficulty and no material build-up could be detected in the mould even after a relatively long service life.

Recipe 4

As Recipe 1, except that 8 parts by weight of component MRC 4 were used instead of MRC 1.

The moulded article was released somewhat less favourably from the die than was the case with Recipe 3 but no build-up was detectable after a relatively long production run.

Recipe 5

As Recipe 1, except that 10 parts by weight of component MRC 5 were used instead of MRC 1.

The door trim left the die without difficulty from the start and no build-up could be detected after a relatively long production time.

Recipe 6

As Recipe 1, except that 10 parts by weight of component MRC 6 were used instead of MRC 1.

The door trim left the die without difficulty and no die build-up could be detected in the mould after a relatively long service life.

The good processing properties of the above-mentioned recipe alternatives were underlined by the fact that, in moulds having some build-up caused by the use of recipes based on conventional internal mould release compositions, a good mould release action was immediately achieved and the build-up disappeared in the course of further manufacture.

Also advantageous was the problem-free adhesive bonding of fastening elements and inserts of plastics. These were inserted into the die and connected with the PU matrix during compression moulding. Tear-off tests provided verification of good adhesion results with cohesive fracture behaviour.

All the formulations had a shelf life of at least 6 months without any decline in reactivity.

If 5 parts zinc stearate, dissolved in 5 parts amine as solubility promoter, were used as mould release agent in formulations 1 to 6, in accordance with U.S. Pat. No. 4,585,803, Example 3, a clear solution was initially obtained, which became turbid, gelled and increased markedly in viscosity within a week, however. It was substantially more difficult to process and to apply to the natural fibre mats used. The flow behaviour or impregnation of the natural fibre mats during the compression moulding process was negatively influenced.

| Recipe 7 | |
|---|---|
| Polyol 3 | 30 parts by weight |
| Polyol 6 | 20 parts by weight |
| Polyol 9 | 33.5 parts by weight |
| Polyurax SR 242 (manufacturer OSi) | 2.3 parts by weight |
| Thancat AN 10 (manufacturer Air Products) | 1.3 parts by weight |
| Acetic acid | 0.3 parts by weight |
| Water | 1.4 parts by weight |
| Baydur Schwarzpaste DN (manufacturer Bayer AG) | 3.3 parts by weight |
| Component MRC 4 | 8 parts by weight |
| Polyisocyanate 1 | 154 parts by weight |

The recipe was introduced into a steel mould 600×1000×3 mm under the conventional conditions for processing polyurethane raw materials. The steel mould contained as insert a glass mat with a weight per unit area of 600 g/m². The die temperature amounted to approximately 75° C. The resultant total raw density was 950 kg/M³. The demoulding time was 120 secs.

From the very first article, the moulded articles could be removed without difficulty from the open mould, without any product build-up arising in the mould after a relatively high number of demoulding operations.

Recipe 8

Formulation as 7, wherein component MRC 4 was exchanged for 8 parts by weight of heat-dissolved component MRC 1.

The plate fell out of the mould upon opening thereof No build-up in the mould caused by raw materials gradually collecting therein could be observed even with high production numbers.

Further processing of the moulded articles produced, such as final foaming of semirigid PU foam systems, application by lamination of films and decorations, e.g. on the basis of ABS, PVC, TPO and backed textiles, as well as adhesion with suitable 2 component PU adhesives could be readily carried out without complex post-treatment.

Using the process it is possible to manufacture external and internal automobile parts, such as door trim, seat shells, together with sumps, A, B, C column trim, rear parcel shelves, boot liners, sun roof trays, dashboards and engine compartment encapsulating components.

What is claimed is:

1. A process for the production of polyurethane mouldings, comprising reacting (I) a polyisocyanate component, with (II) an isocyanate-reactive component, in the presence of (III) from 0.5 to 20 parts by weight, based on 100 parts by weight of component (II), of an internal mould release agent, consisting of:

a) at least one ammonium or metal salts of phosphoric acid esters of the formula (I)

wherein:
R: represents a $C_1$–$C_{10}$ alkyl radical,
X: represents O—$Y^+$ or $OR^1$
   in which
   $R^1$ represents R,
and
Y: represents:
   (1) an $NH_4$ group,
   (2) a group corresponding to the general formula:

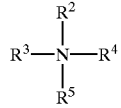

wherein:
$R^2$ to $R^5$: are each independently selected from the group consisting of:
   (i) a hydrogen atom,
   (ii) a $C_1$–$C_{10}$ alkyl radical which may be mono- or polysubstituted by the groups $OR^6$ or $NR^6R^7$, in which $R^6$ and $R^7$ each independently represent a hydrogen atom or a $C_1$–$C_{10}$ alkyl radical;
and
   (iii) correspond to the general formula:

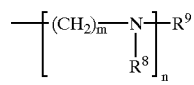

wherein:
$R^8$ and $R^9$: each independently represent a hydrogen atom or a $C_1$–$C_{10}$ alkyl radical:
m: represents a whole number from 2 to 4; and
n: represents a whole number from 1 to 5;
with the proviso that at least one of $R^2$, $R^3$, $R^4$ and $R^5$ represents a hydrogen atom;

or
(3) a metal of the first main group of the periodic system of elements (Mendeléeff);

and, optionally, one or more components selected from the group consisting of b) and c), wherein:

b) comprises one or more ammonium salts of carboxylic acids corresponding to the formula (II)

  (II), wherein:

$R^{10}$ represents a hydrogen atom, a $C_1$–$C_9$ alkyl radical, or a $C_6$–$C_{10}$ aryl radical, which may optionally be substituted by $C_1$–$C_3$ alkyl groups;

and

Z represents:
(1) an $NH_4$ group, or
(2) a group corresponding to the formula:

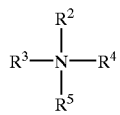

wherein:
$R^2$ to $R^5$: are each independently selected from the group consisting of:
(i) a hydrogen atom,
(ii) a $C_1$–$C_{10}$ alkyl radical which may be mono- or polysubstituted by the groups $OR^6$ or $NR^6R^7$, in which $R^6$ and $R^7$ each independently represent a hydrogen atom or a $C_1$–$C_{10}$ alkyl radical;
and
(iii) correspond to the general formula:

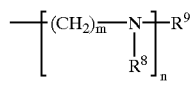

wherein:
$R^8$ and $R^9$: each independently represent a hydrogen atom or a $C_1$–$C_{10}$ alkyl radical:
m: represents a whole number from 2 to 4;
and
n: represents a whole number from 1 to 5;
with the proviso that at least one of $R^2$, $R^3$, $R^4$ and $R^5$ represents a hydrogen atom;

and c) comprises one or more ammonium or metal salts of sulfonic acids corresponding to the general formula (III)

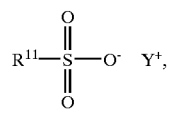  (III)

wherein:
$R^{11}$: represents a hydrogen atom, a $C_1$–$C_9$ alkyl radical, or a $C_6$–$C_{10}$ aryl radical, which may optionally be substituted by $C_1$–$C_3$ alkyl groups;
and
Y: represents:
(1) an $NH_4$ group;
(2) a group corresponding to the formula:

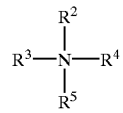

wherein:
$R^2$ to $R^5$: are each independently selected from the group consisting of:
(i) a hydrogen atom,
(ii) a $C_1$–$C_{10}$ alkyl radical which may be mono- or polysubstituted by the groups $OR^6$ or $NR^6R^7$, in which $R^6$ and $R^7$ each independently represent a hydrogen atom or a $C_1$–$C_{10}$ alkyl radical;
and
(iii) correspond to the general formula:

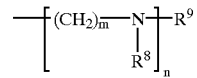

wherein:
$R^8$ and $R^9$: each independently represent a hydrogen atom or a $C_1$–$C_{10}$ alkyl radical:
m: represents a whole number from 2 to 4;
and
n: represents a whole number from 1 to 5;
with the proviso that at least one of $R^2$, $R^3$, $R^4$ and $R^5$ represents a hydrogen atom;
or
(3) a metal of the first main group of the periodic system of elements (Mendeléeff).

2. A process for the production of fiber reinforced polyurethane mouldings, comprising reacting (I) a polyisocyanate component, with (II) an isocyanate-reactive component, in the presence of (III) the internal mould release agent of claim 1, and (IV) one or more glass fibers or natural fibers.

* * * * *